(12) United States Patent
Faulring et al.

(10) Patent No.: US 7,905,186 B2
(45) Date of Patent: Mar. 15, 2011

(54) TRANSPLANTING APPARATUS

(75) Inventors: Frank W. Faulring, North Collins, NY (US); Robert Chope Gill, II, Woodland, CA (US); Jonathan C. Gobel, Willows, CA (US)

(73) Assignees: The Morning Star Company, Woodland, CA (US); Faulring Mechanical Devices, Inc, North Collins, NY (US)

( * ) Notice: Subject to any disclaimer, the term of this patent is extended or adjusted under 35 U.S.C. 154(b) by 0 days.

(21) Appl. No.: 12/699,928

(22) Filed: Feb. 4, 2010

(65) Prior Publication Data

US 2010/0170426 A1   Jul. 8, 2010

Related U.S. Application Data

(63) Continuation-in-part of application No. 12/221,081, filed on Jul. 31, 2008.

(60) Provisional application No. 61/206,804, filed on Feb. 4, 2009, provisional application No. 61/274,988, filed on Aug. 24, 2009.

(51) Int. Cl.
*A01C 11/00* (2006.01)
(52) U.S. Cl. ........................... 111/105; 111/900; 111/919
(58) Field of Classification Search .......... 111/100–117, 111/200, 900, 919, 921, 922
See application file for complete search history.

(56) References Cited

U.S. PATENT DOCUMENTS

| | | | |
|---|---|---|---|
| 4,644,880 A | 2/1987 | Branch | |
| 4,869,637 A | 9/1989 | Degroot | |
| 5,431,116 A | 7/1995 | Gao | |
| 5,573,558 A | 11/1996 | Huang | |
| 5,676,072 A | 10/1997 | Williams | |
| 5,765,491 A | 6/1998 | Brower | |
| 6,073,564 A | 6/2000 | Keskilohko | |
| 6,080,951 A * | 6/2000 | Thijssen et al. | 209/577 |
| 6,327,986 B1 | 12/2001 | Williames | |
| 6,634,306 B1 | 10/2003 | Faulring | |
| 2009/0031935 A1 | 2/2009 | Faulring | |

FOREIGN PATENT DOCUMENTS

| | | |
|---|---|---|
| DE | 698 10 416 T2 | 11/2003 |
| EP | 0 390 289 A1 | 10/1990 |
| EP | 0390289 A1 * | 10/1990 |

* cited by examiner

*Primary Examiner* — Christopher J. Novosad
(74) *Attorney, Agent, or Firm* — John C. Thompson; Sandra J. Thompson

(57) ABSTRACT

A transplanting apparatus which can plant virtually 100% of the seedlings from a nursery tray, while avoid skips when planting which may happen when seeds in a tray row fail to grow into seedlings. This is accomplished by picking up an entire row of seedlings from a tray, transferring the seedlings to a mechanism which eliminates gaps between seedlings, and then discharging the seedlings one at a time to the ground with a desired spacing between the seedlings while having full physical control of the seedlings. A root ball compressor is provided to provide better control of the seedlings as the compressed root balls are less likely to tip over, and the compressed root balls are easier to be grabbed by the pinch disks.

12 Claims, 10 Drawing Sheets

US 7,905,186 B2

TRANSPLANTING APPARATUS

CROSS-REFERENCE TO RELATED APPLICATIONS

The present application is a continuation-in-part of U.S. patent application Ser. No. 12/221,081 filed Jul. 31, 2008, and entitled TRANSPLANTER, and published as US-2009-0031935-A1. This application also claims priority from U.S. provisional patent application 61/206,804 filed Feb. 4, 2009 and U.S. provisional patent application 61/274,988 filed Aug. 24, 2009.

TECHNICAL FIELD

The present invention relates generally to transplanting apparatus, and more particularly to one which can plant virtually 100% of the seedlings from a nursery tray, while avoid skips when planting which may happen when seeds in a tray row fail to grow into seedlings. This is accomplished by picking up an entire row of seedlings from a tray, transferring the seedlings to a mechanism which eliminates gaps between seedlings, and then discharging the seedlings one at a time to the ground with a desired spacing between the seedlings while having 100% control of the seedlings.

BACKGROUND OF THE INVENTION

Transplanting apparatus is well known in the art. Typical transplanters, which transplant from a plant tray, are shown in U.S. Pat. Nos. 4,644,880; 5,431,116; 5,573,558; 5,676,072; 6,073,564; and 6,634,306. Frequently there are skips between seedlings which may occur when seeds in a tray row fail to grow into seedlings. Transplanters which try to eliminate skips include U.S. Pat. No. 6,327,986 which discloses three separate sets of sensors to look for plant skips and advance a root ball chamber belt assembly one cell to make up for skips and eject the deficient root ball at the same time. U.S. Pat. No. 6,080,951 discloses another approach to overcome the seedling tray skip problem. These approaches rely heavily on the accuracy of detectors to sense the presence of plant foliage. Considering the chaotic nature of the foliage and the necessary speed to be efficient, there is substantial room for error in these systems. Prior U.S. published application No. US-2009-0031935-A1 uses conveyor belts which push together the root balls of the rows of plants extracted from a plant tray.

Unfortunately, the root balls in a tray, when received at the transplanter, are not always firm and fully packed, making the subsequent handling somewhat difficult. Thus the root ball may tip over when placed on a conveyor belt. In addition, it may be difficult for a pinch disk to grab the root ball.

In U.S. published application No. US-2009-0031935-A1, the subject matter of which is incorporated herein by reference thereto, after gaps between seedlings have been eliminated, individual seedlings pass through a drop tube to a mechanism for discharging the seedlings one at a time to the ground with a desired spacing between the seedlings.

It is a feature of the foregoing patent application that the transplanter has a forward pair of transfer disks; a rear pair of planter disks; and an air knife mounted adjacent the forward pair of transfer disks for extending the stem and foliage of a seedling while in the forward pair of transfer disks for proper engagement by the rear pair of planting disks. It has been found that approximately 95% of seedlings will pass through a drop-tube type planter system without issues. The last 5% consists of plants with poor root systems, crooked stems, dwarfed size and soft stems. These types of plants tend to drag on the side of the drop tube and travel slowly because the soil has dislodged from the root ball or tipped over because of the soft stems. This results in skips and drop tube plugging issues.

OBJECTS AND SUMMARY OF THE INVENTION

It is an object of the present invention to overcome the problems which occur when trying to transplant poor quality seedlings, which may have poor quality root balls, crooked stems, dwarfed size, tangled foliage, soft stems, etc.

More particularly it is an object of this invention to provide a transplanting method for transplanting seedlings grown in trays having a plurality of side-by side rows of seedling cells, which method plants the seedlings uniformly apart even though not all cells have seedlings, the method including the steps of picking up an entire row of seedlings from a tray by engaging the stems of the seedlings, which row in the tray may have gaps between seedlings, transferring the seedlings to a mechanism which eliminates gaps between seedlings, and, maintaining full control of each seedling as it is moved from the mechanism which eliminates gaps to the ground one at time with a desired spacing between the seedlings to a mechanism which plants the seedlings; whereby the seedlings are planted uniformly spaced apart in the ground.

It is a further object of the present invention to provide a transplanting apparatus for transplanting seedlings grown in trays having a plurality of side-by side rows of seedling cells, which transplanting apparatus plants the seedlings uniformly apart even though not all cells have seedlings, the transplanting apparatus having means for picking up an entire row of seedlings from a tray by engaging the stems of the seedlings, having means for eliminating gaps between seedlings, and means for discharging and planting the seedlings while maintaining full control of the seedling as they are moved from the means for eliminating gaps until they are planted.

It is an additional object of the present invention to provide a transplanting apparatus of the type set forth above with means for compressing the root balls along their length so they can be handled better, the compressing means being located between the means for eliminating gaps and the transferring means.

The above and other objects and advantages of this invention will become more apparent from a consideration of the following detailed description taken in conjunction with the accompanying drawings in which a preferred form of the invention is illustrated.

BRIEF DESCRIPTION OF THE FIGURES

In the following views right hand and left hand reference is determined by standing behind the transplanter and facing its direction of travel. In addition, terms such as raised and downwardly are with reference to the parts as shown in the various views.

DETAILED DESCRIPTION

Figure 1:
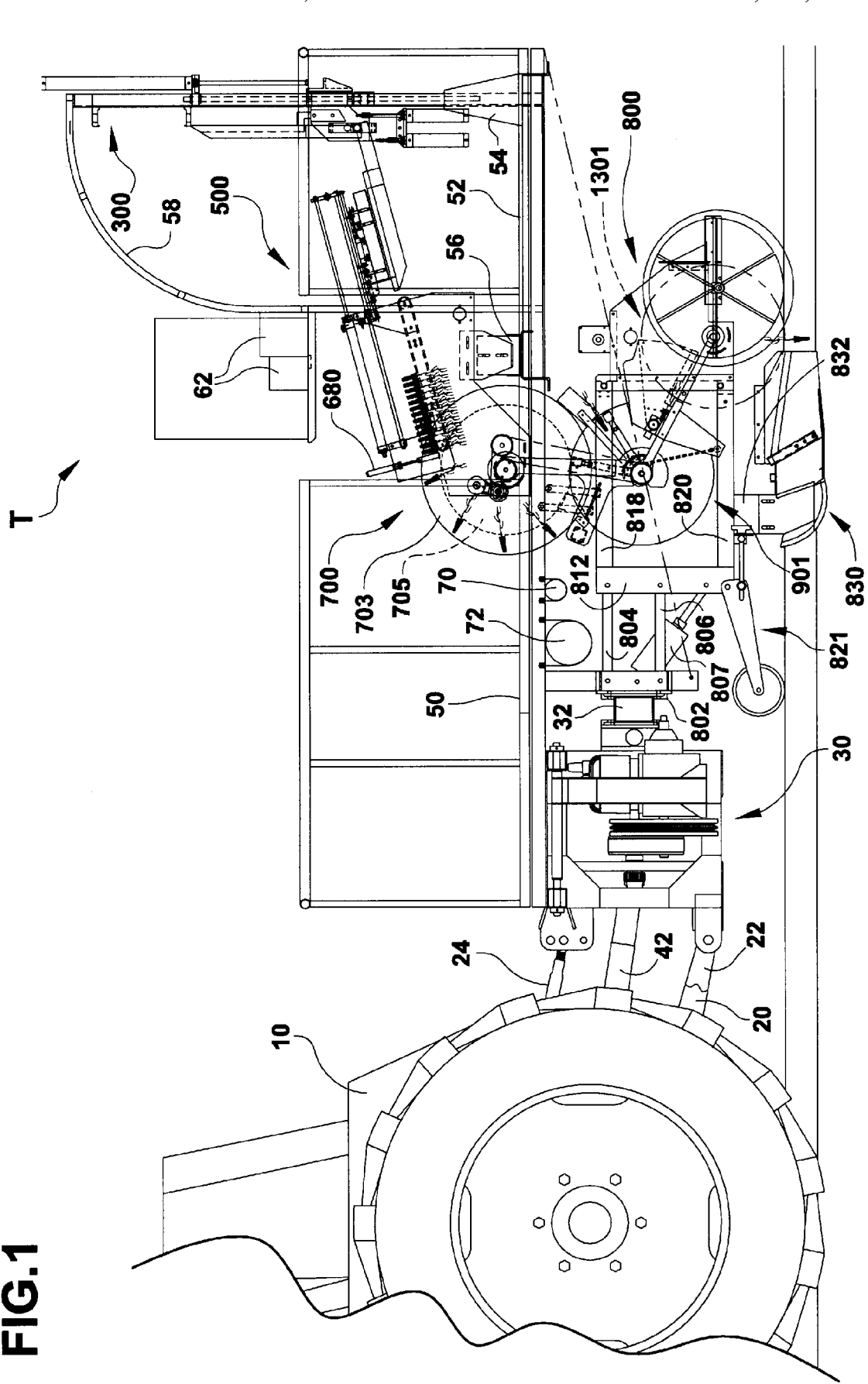
FIG. 1 is a left side elevational view of a one row transplanter of this invention mounted behind a tractor, this view showing the mechanism for picking up an entire row of seedlings from a tray, transferring the seedlings to a mechanism which eliminates gaps between seedlings, and a discharge and planting mechanism for discharging the seedlings one at a time to the ground with a desired spacing between the seedlings, some parts not being illustrated.
Figure 2:
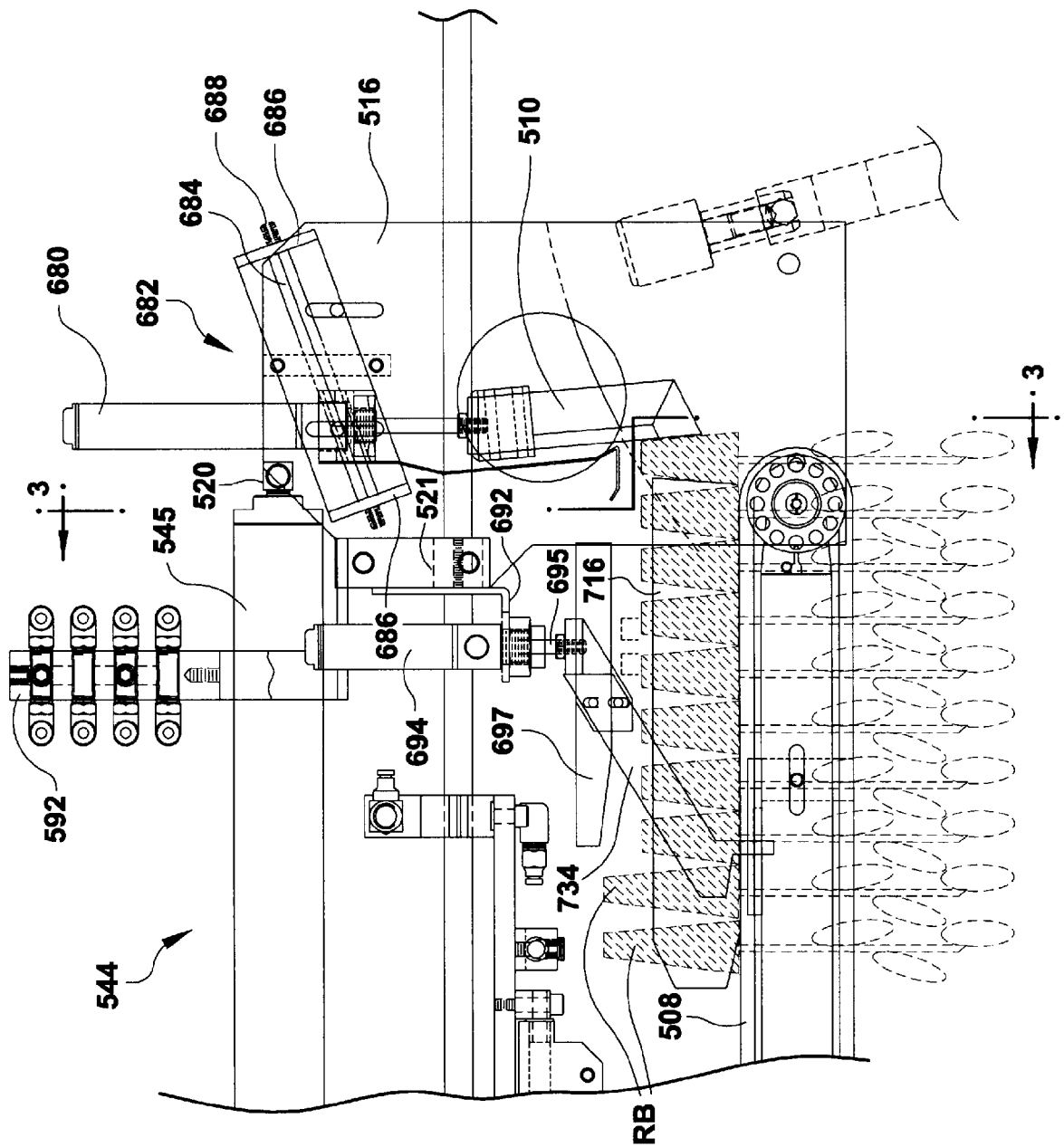
FIG. 2 is a side view showing a number of seedlings on gap up belts with the cut-off gate extended to its raised position, and the root ball pinchers retracted, permitting the row plants to travel up to the cut-off gate and to gap up any missing plants, a root ball compressor and cut-off knives being shown in their raised retracted position.

The transplanter of this invention is indicated generally at "T" in FIG. 1. It may be semi-integrally mounted on the three point hitch 20, 22, 24 of a tractor 10, only a portion of which is shown in FIG. 1. A box-like subframe indicated generally at 30 is in turn carried by the three point hitch. Mounted on the back of the subframe 30 is a tool bar 32 which in turn carries a pivoted sub-frame, not shown, for supporting wheels, also not shown. Each of the wheels may be moved up and down. As this design is conventional, it is not illustrated.

Mounted on the sub-frame 30 are high volume and high pressure air compressors, a 24 volt alternator, and a 24 volt battery source, the compressors and alternator being powered by the PTO shaft 42 of the tractor 10. The transplanter includes an operator support or platform 50. Mounted on the operator support 50 is a horizontal transplanter subframe 52. This in turn carries vertical subframe assemblies indicated generally at 54 and 56. An arched subframe 58 extends from a location above the top of the vertical subframe 54 forwardly and downwardly to a location adjacent subframe 56. The arched subframe 58 carries many air lines and electrical controls, not shown. In addition, control modules 62 may be mounted on the subframe 58. A high pressure air reservoir 70 and a low pressure air manifold 72 are carried below the platform 50.

The transplanter consists of several major subassemblies. A first major subassembly is the tray indexing mechanism (not shown). The subassembly for picking up an entire row of seedlings from a tray is indicated generally at 300. These various components of the transplanter of this invention will not be discussed in detail as they are adequately discussed in US published application 2009-0031935-A1. The subassembly which eliminates gaps between seedlings is indicated generally at 500 and includes continuously running gap-up belts 506, 508, and a cut-off gate 510, as shown in FIGS. 2-5. These various components will be discussed in detail below. In addition to the above, there is a planter assembly, which plants individual seedlings in the ground, the planter assembly including a planter frame subassembly indicated generally at 800, which frame subassembly supports furrow opening and closing mechanisms.

Gap Eliminating Subassembly

The subassembly which eliminates gaps between seedlings and which compresses the root balls is best illustrated in FIGS. 2-5. The gap eliminating subassembly includes a plant transfer carriage or seedling loader group, which group carries root ball which will engage the root balls RB of the seedlings and move them towards and over a pair of gap-up belts 506, 508 which run continuously during the operation of the apparatus of this invention. As the root ball loaders of this invention are more fully described in US published application 2009-0031935-A1, they will not be described in detail here. When the root balls of the seedlings are fully positioned over the gap-up belts, they will be released by the root ball loaders, and the tops of the root balls, which are in an upside-down position, will rest on the gap-up belts for movement towards a cut-off gate 510. The cut-off gate will be operated in a suitable manner to release one seedling at a time, which seedling will be picked up by a discharge mechanism, or inverter disk assembly 700, which includes outer and inner disks 703, 705 best shown in FIG. 1.

Figure 5:
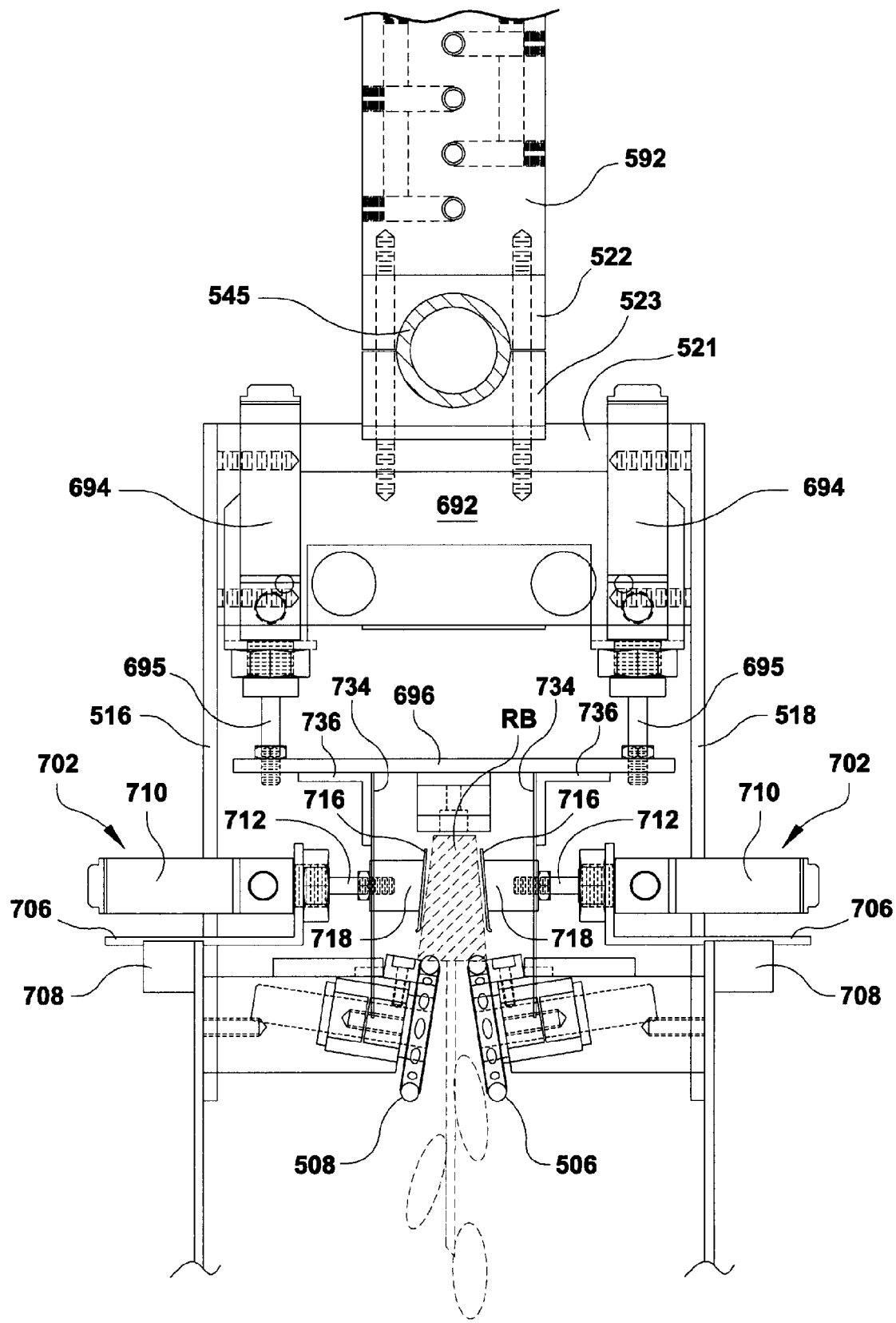
FIG. 5 is a section taken generally along the line 5-5 in FIG. 4.

The root ball loaders are moved between a forward position and a rear position by an air cylinder assembly 544, which includes cylinder 545. The anchor end of cylinder 545 is supported by a transverse structure 520 which is in turn supported by right and left side plates 516, 518. An air manifold block 592 is supported on the cylinder 545 by upper and lower clamps 522, 523 as shown in FIG. 5.

As set forth above, the gap-up belts 506, 508 are driven continuously during the operation of the machine and will cause the root balls RB placed on the belts to move towards a cut-off gate 510, closing up the root balls and eliminating any gaps between the root balls which may be caused by seeds failing to germinate, or the like. More particularly, the cut-off gate 510 has the function of stopping the lead root ball so that next trailing root ball will press against the leading root ball, thus eliminating any gaps. In addition, the cut-off gate will be operated to release individual root balls at precise intervals to insure that proper planting spacing may be achieved. In the illustrated embodiment, the single cut-off gate 510 is operated by a pair of double acting air cylinders 680, only one of which is shown, which cylinders are supported for adjustable longitudinal fore and aft movement by a carriage assembly 682 supported for adjustable movement on a pair of longitudinally extending rods 684 which are in turn supported by opposed plates 686. The plates are in turn supported on the right and left upper side plates 516, 518 in any suitable manner. A screw mechanism including a screw 688 may be used to adjust the position of the gate to accommodate root balls of differing diameters as differing nurseries use plant trays having differing sized cells.

Figure 3:
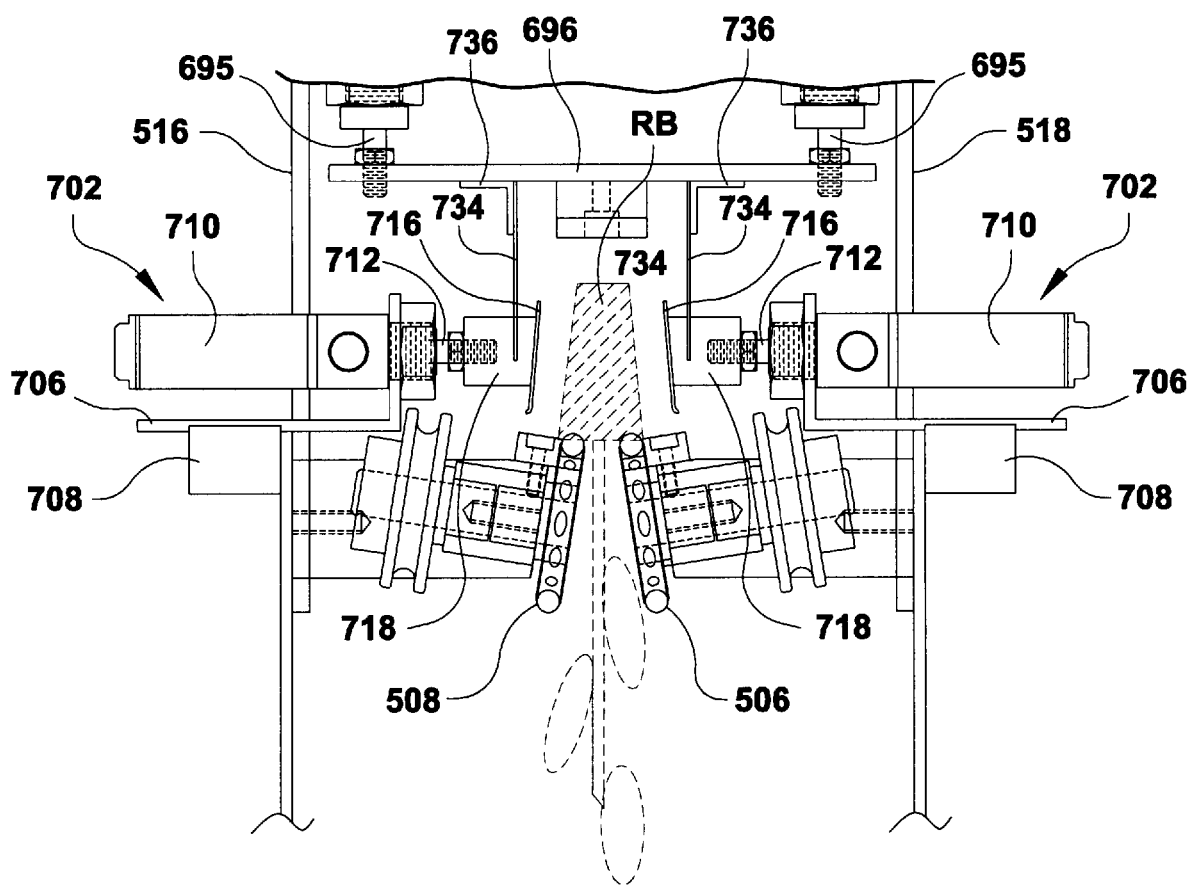
FIG. 3 is a partial section taken generally along the line 3-3 in FIG. 2.
Figure 4:
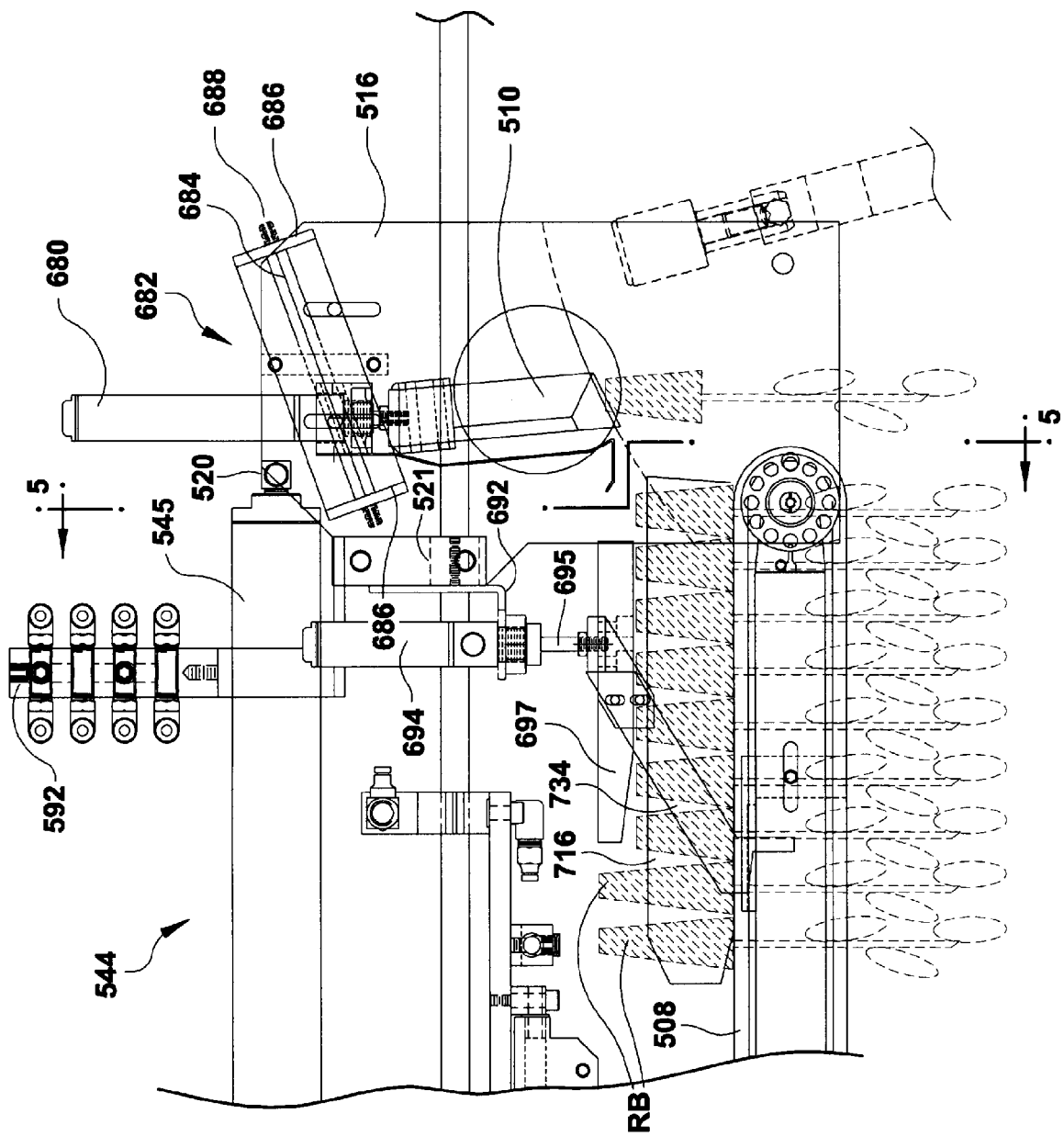
FIG. 4 is a side view, similar to FIG. 2, but showing the cut-off gate retracted, the trash knives extended downwardly, the overhead root ball compressor extended downwardly to crush the root balls to approximately ¾ of their original length, the first set of inverter disks gripping a single root ball, and the root ball pinchers extended to secure all root balls on the gap-up belts.

According to this invention means are provided to compress the root balls while on the gap-up belts 506, 508. To this end an L-shaped bracket 692 is mounted on a further transverse structure 521 as shown in FIG. 5, upon which are mounted double acting air cylinder assemblies 694. The rods 695 of the cylinder assemblies are secured to a transverse plate 696 which carries at its lower end a longitudinally extending member 697 which may contact the root balls RB. Cut-off knives 734 are carried by L-shaped brackets 736 mounted on the transverse plate 696. As the root balls RB move towards the cut-off gate, the knives 734 will strip away excess trash which may be associated with the root balls. In addition, the knives will move up and down with the rood ball compressor 697, and this movement will facilitate the removal of the trash associated with the root balls The operation of the cut-off gate cylinder assembly 680 is responsive to a PLC (or the equivalent) trigger input received from a wheel encoder processor, which is in turn responsive to a signal generated from a wheel encoder carried by a sensing wheel (not illustrated) which generates a distance signal as a function of the distance traveled by the transplanter. In addition, root ball pinchers, indicated generally at 702 in FIGS. 3 and 5, will act in concert with the gate 510, to control the discharge of a root ball at selected time intervals. The right and left root ball pinchers 702 are mounted on the upper edge of the right and left upper side plates 516 and 518, respectively. To this end, each of the root ball pinchers includes a L-shaped bracket 706 secured to a bar 708 secured to an upper end of the side plate 516 or 518. The cylinder 710 of a double acting air cylinder assembly is secured to the L-shaped bracket 706, the rod 712 of the cylinder passing through the bracket 706, the root ball pinchers 702 being secured to the end of the rod 712. Each root ball pincher includes a flared pressure plate 716 mounted on a block 718, which is in turn secured to the rod 712. Simultaneous actuation of the cylinder assemblies 710, 712 will cause opposed root ball pinchers in the form of the pressure plates 716 to either move towards each other to pinch and hold the root balls from further movement, or to release the root balls so that they can be advanced, FIG. 3 showing the root ball pinchers in their retracted position, and FIG. 5 showing the root ball pinchers in their root ball holding position.

In operation, the cylinder assemblies 710 will be operated at substantially the same time to extend the pressure plates 716 into engagements with the sides of the root balls, and, at the same time, the cylinder assemblies 694 will be operated simultaneously to force the longitudinally extending member 697 into contact with the bottom of the inverted root balls RB which are between the pressure plates 716 to compress the root balls RB along their length. As can be seen from FIGS. 2 and 4, not all root balls are compressed, but the ones nearest the cut-off gate 510 are. At or near the full extension of the cylinder assemblies 694 and 710 the cylinder assembly 680 will be retracted to permit the leading seedling to be discharged to the disks 703. It should be noted that the timing to the cylinders 694 and 710 is coordinated with the timing of the gate cylinder assembly 680. After the leading root ball has been discharged, all of the cylinders 680, 694, and 710 will be moved to their initial position.

Plant Delivery System

In accordance with this invention a plant delivery system is provided which maintains 100% control of the seedlings after they leave the cut-off gate 680 of the gap eliminating mechanism. Thus there is provided an inverter disk assembly indicated generally at 700 and which is supported on shaft 615 (FIG. 6), a middle plant transition disk assembly 901 carried by arms which extend downwardly from shaft 615, and a row unit disk assembly 1301 carried by the planter subassembly 800. The shaft 615 is carried by the transplanter subframe 52, the shaft 615 and gap-up belts 506, 508 being driven by a DC motor in the same manner as shown and described in US-2009-0031935-A1.

Figure 6:
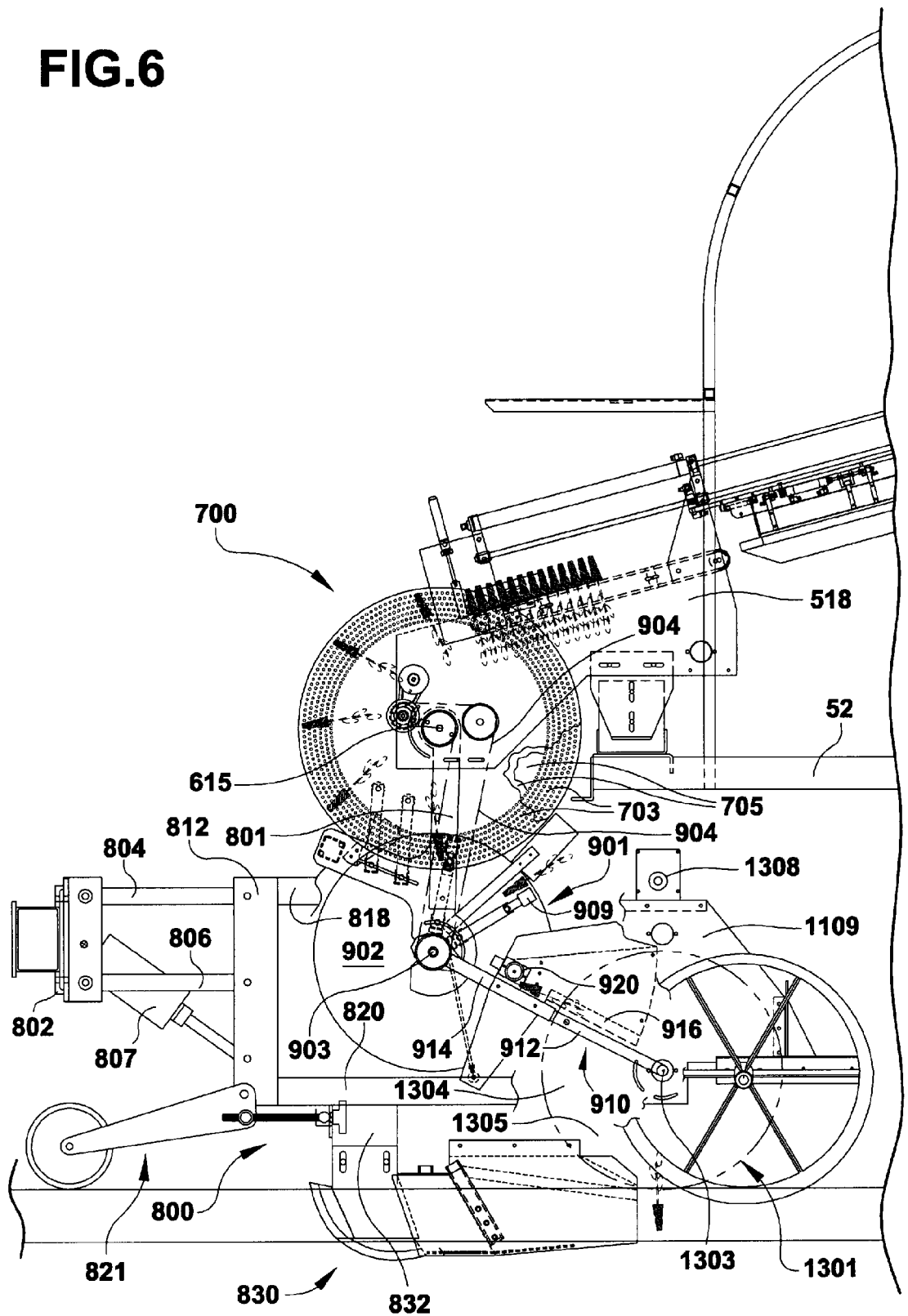
FIG. 6 is a view similar to FIG. 1, but on a larger scale, some nonessential parts not being shown.

As best shown in FIG. 6, the inverter disk assembly 700 consists of a pair of flexible outer disks 703 and a pair of flexible inner disks 705, which are of a lesser diameter. Means are provided to move the periphery of each of the pairs of disks towards and away from each other as they are rotated in a counter clockwise direction as viewed in FIG. 6. Thus, the periphery of the outer disks, when in the 12 o'clock position, will be moved towards each other to grasp each discharged root ball. The root balls are caused to be rotated to the 7 or 8 o'clock position with the outer disks 703. At this location the periphery of the inner disks 705, which are rotating at the same speed as the outer disks, will be moved towards each other to capture and/or pinch the plant foliage of each seedling. After a little more rotation, the periphery of the outer disks 703 will forced apart to release the root ball. To this end, the side plates 516, 518 and each of the arms 801 carries supports for rollers and shields which will cause the disks 703 and 705 to open and close at the appropriate times, the rollers preferably being carried by suitable leaf springs. It is a feature of this invention that the pair of outer disks 703 is formed of high density polyethylene plastic which have their outer periphery formed with many apertures as shown in FIG. 6 for the purpose of providing a more flexible and aggressive surface.

The middle plant transition disk assembly 901 includes a pair of high density polyethylene plastic disks 902 secured to rotatable shaft 903 for clockwise rotation therewith. The shaft 903 is carried by a pair of fixed length swing arms 801 which are journalled at their upper ends on the shaft 615 and at their lower ends to shaft 903. The shaft 903, including the disks mounted on it, has its speed synchronized to the inverter disk assembly 700. To this end, it is caused to be driven by a chain or cogged belt 904 which passes over suitable drive, driven, idler, and tensioning sheaves, which are not numbered. As shown, the drive sprocket or sheave is supported on shaft 615, the idler and tensioning sheaves are supported on side plate 518, and the driven sheave is keyed to the shaft 903. Rollers and shields will cause the disks 902 to open and close at the appropriate times. A foliage shield located at approximately the 11 o'clock position as seen in FIG. 6 will cause the disks 902 to be spread apart for the reception of the root balls carried by the disks 703. Meanwhile, as set forth above, the disks 703 are being spread apart as they approach the 6 o'clock position, releasing the root balls for transfer, and during the same time the inner pair of disks 705 will engage the stem and foliage of the seedling to insure that the seedling is under control during the transfer. As the rollers 902 approach the 1 or 2 o'clock position the rollers 909 on leaf springs will force the disks 902 towards each other while a shield (not shown) causes the inner inverter disk 705 when it reaches the 5 o'clock position to be spread apart, thereby releasing the foliage of the root ball being transferred to the middle plant transition disk assembly.

A pair of telescoping lower drag link assemblies 910 is also secured at their upper ends to shaft 903 and its lower end to the shaft 1303. This structure is necessary to deal with the up and down movement of the of the row unit, or planter frame subassembly, 800, as adjustments may be necessary to deal with seedlings of differing heights.

The row unit planter frame subassembly 800 is adapted to be secured to the tool bar 32 shown in FIG. 1. The subassembly, which is more fully disclosed in US-2009-0031935-A1, includes a mounting weldment 802 secured to the tool bar in any conventional manner. Upper and lower parallel links 804 and 806 are pivotally secured to the weldment, and the rear ends of the upper and lower links are pivotally secured to a further weldment 812. Upper and lower rearwardly extending structures 818 and 820, respectively, are secured to the weldment 812. In addition a cylinder 807 is mounted between the weldment 802 and the weldment 812 for the purpose of applying either a raising or a lowering force to the weldment 812. A soil conditioning unit, indicated generally at 821, is pivotally secured to the lower end of weldment 812. The height of the soil conditioning unit can be adjusted by a screw mechanism (no number). A furrow opener 830 is secured to the lower rearwardly extending structure 820 by a vertical bar 832. The furrow opener is of a generally V shaped construction, the apex of the V being to the forward side, and the spaced apart sides of the V being flared to the upper side. As can be seen from a comparison of FIGS. 7-10, the planter subassembly can be moved to a raised position, as shown in FIGS. 7 and 9, or to a lowered position when planting in a flat field as shown in FIGS. 8 and 10.

Each of the telescoping lower drag link assemblies 910 includes telescoping tubular portions 912 and 914 which are caused to move relative to each other by a suitable mechanism 916, which causes telescopic movement. One of the tubular portions 914 has an end portion journalled about shaft 903, and the other tubular portion has an end portion journalled about shaft 1303, shaft 1303 being journalled to the planter subframe 800. Each of the forward tubular portions carries a foliage shield and also carries a vectoring air knife 920 which blows the foliage and stem of the root ball away from the disks 902 to straighten the foliage to facilitate a hand-off to the disk assembly 1301 which include a pair of planting disks 1304, 1305. The drive for the disks includes a motor 1308 mounted on side plates 1109. The speed of the motor is proportional the speed of a ground wheel and is controlled in a manner more fully set forth in published U.S. patent application US-2009-0031935-A1. The disks 1304 and 1305 may be made of high density polypropylene, aore they may be made of fiber reinforced rubber.

Figure 7:
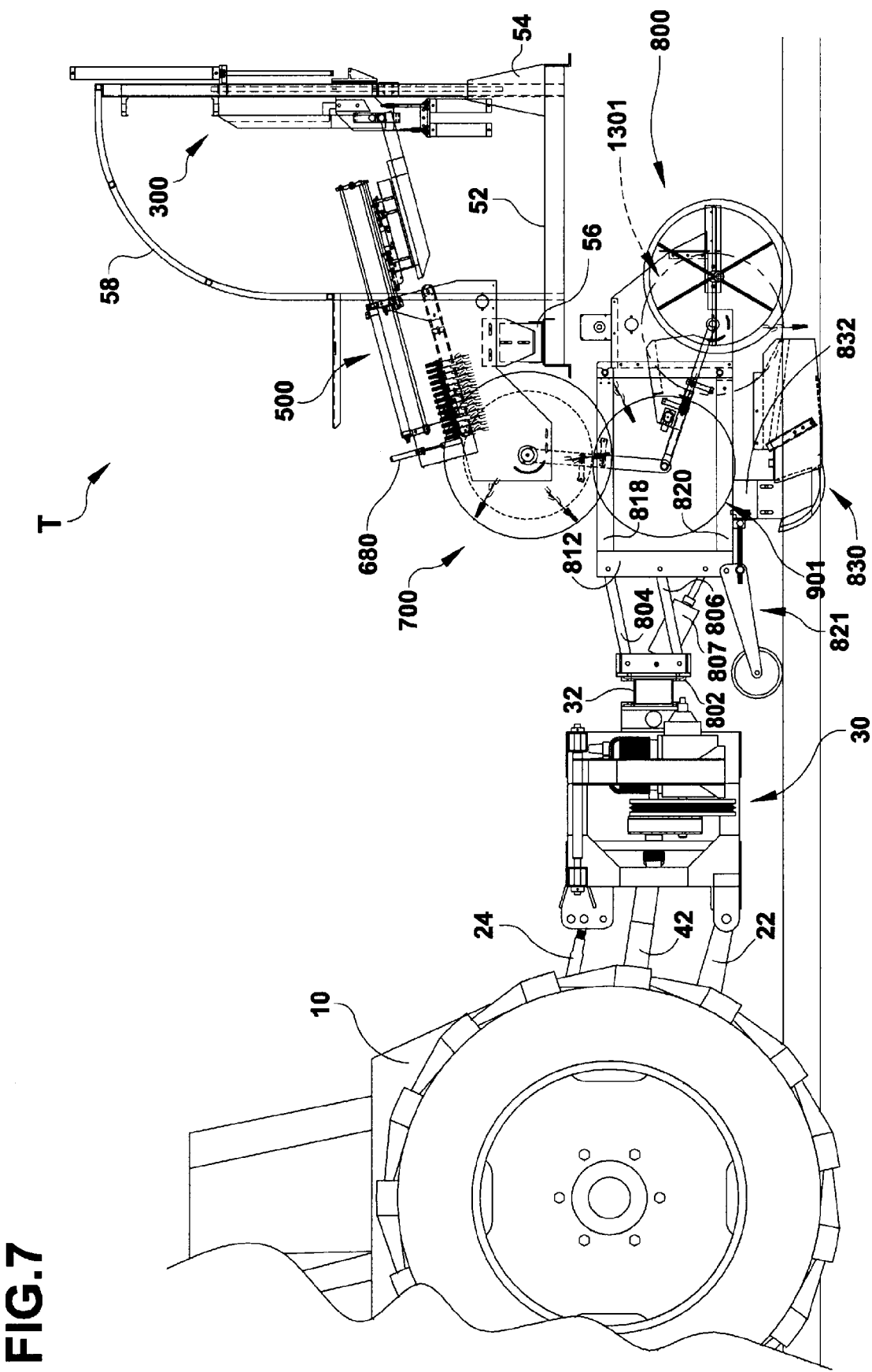
FIGS. 7 and 8 show the transplanter of this invention when planting 5 inch seedlings, FIG. 7 showing the planter subframe when planting in a seedbed which is raised above the tractor wheels, and FIG. 8 showing the planter subframe when planting in a flat field.
Figure 8:
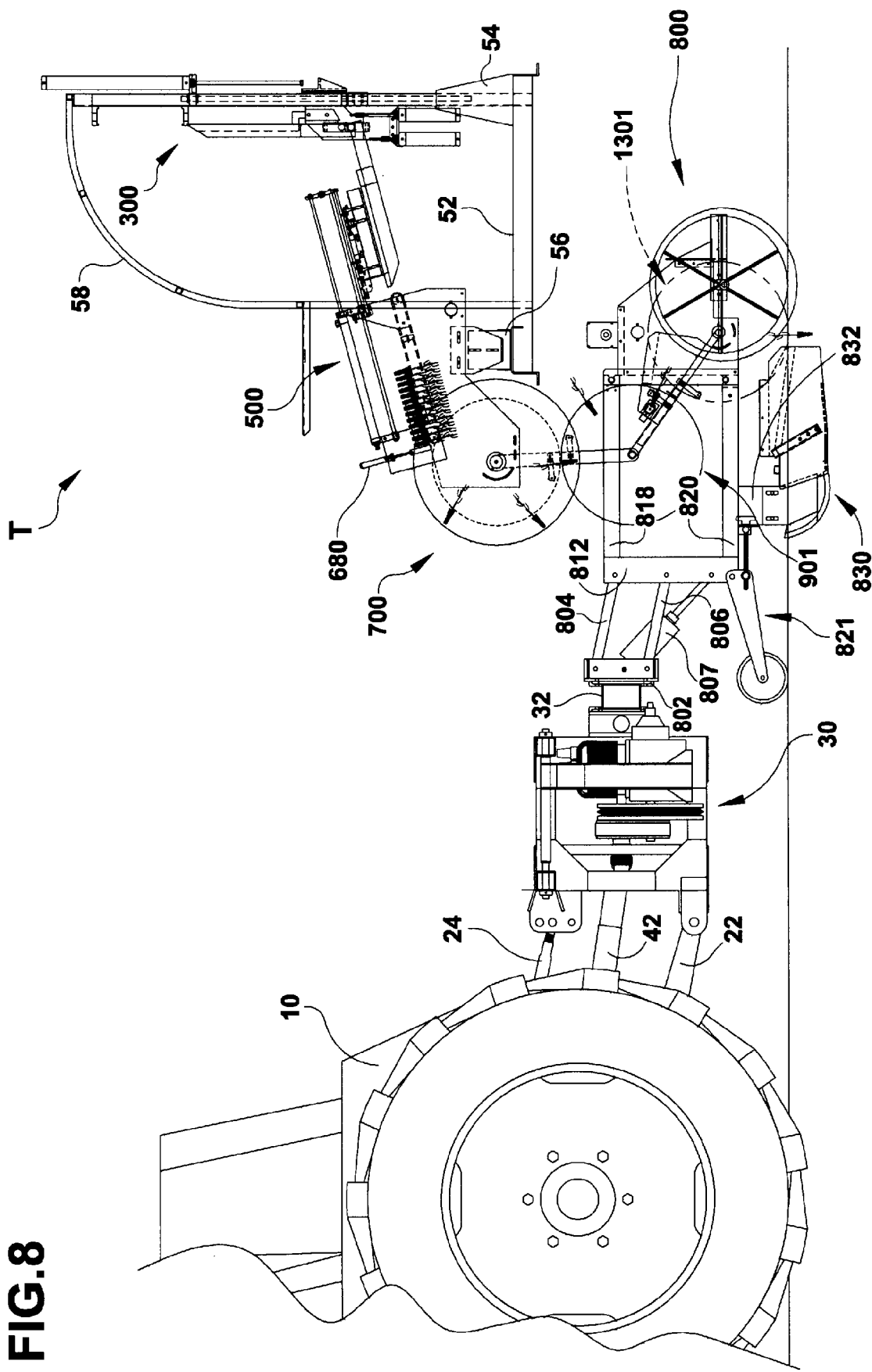
Figure 9:
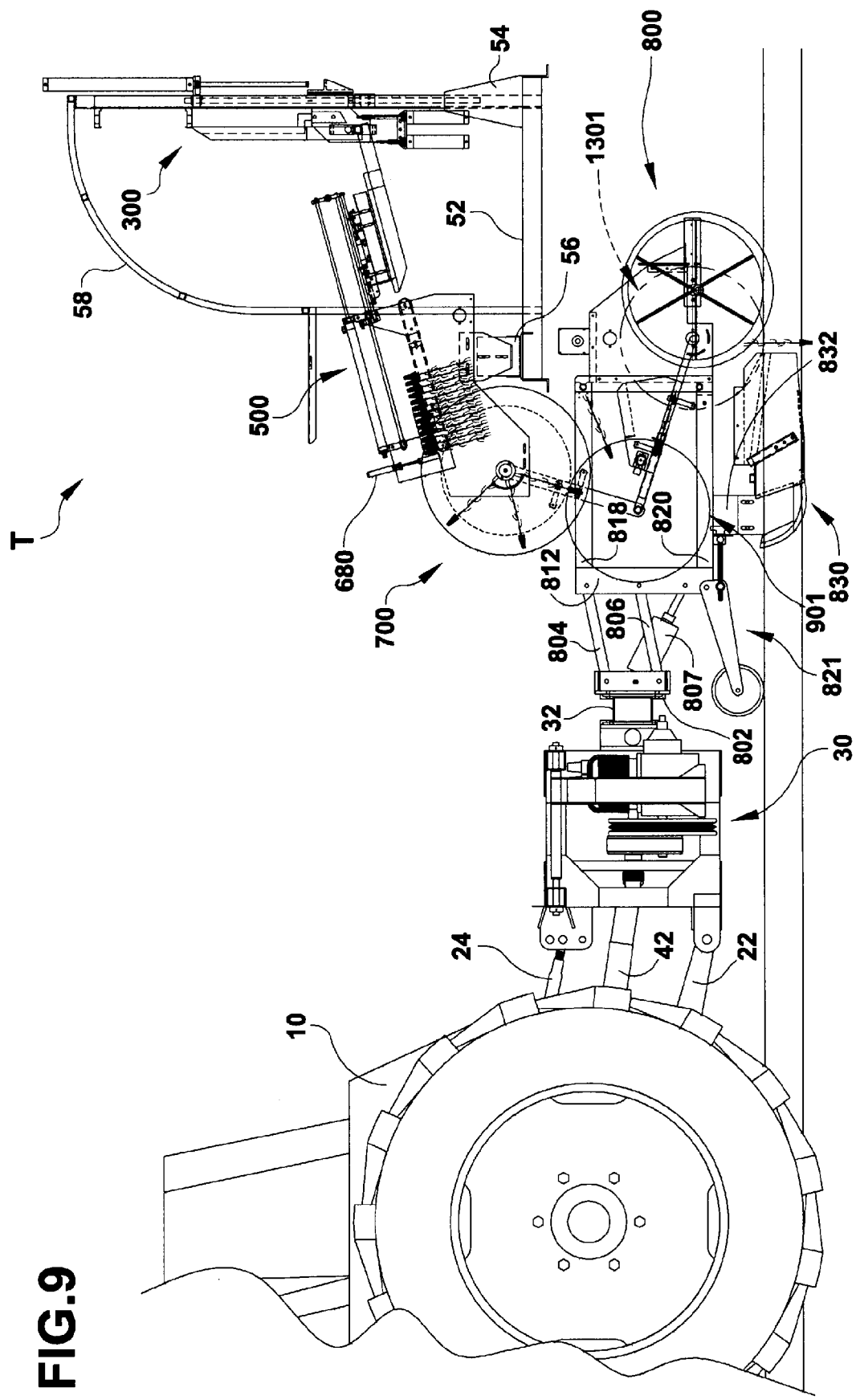
FIGS. 9 and 10 are views similar to FIGS. 7 and 8, but showing the transplanter of this invention when planting 9 inch seedlings.
Figure 10:
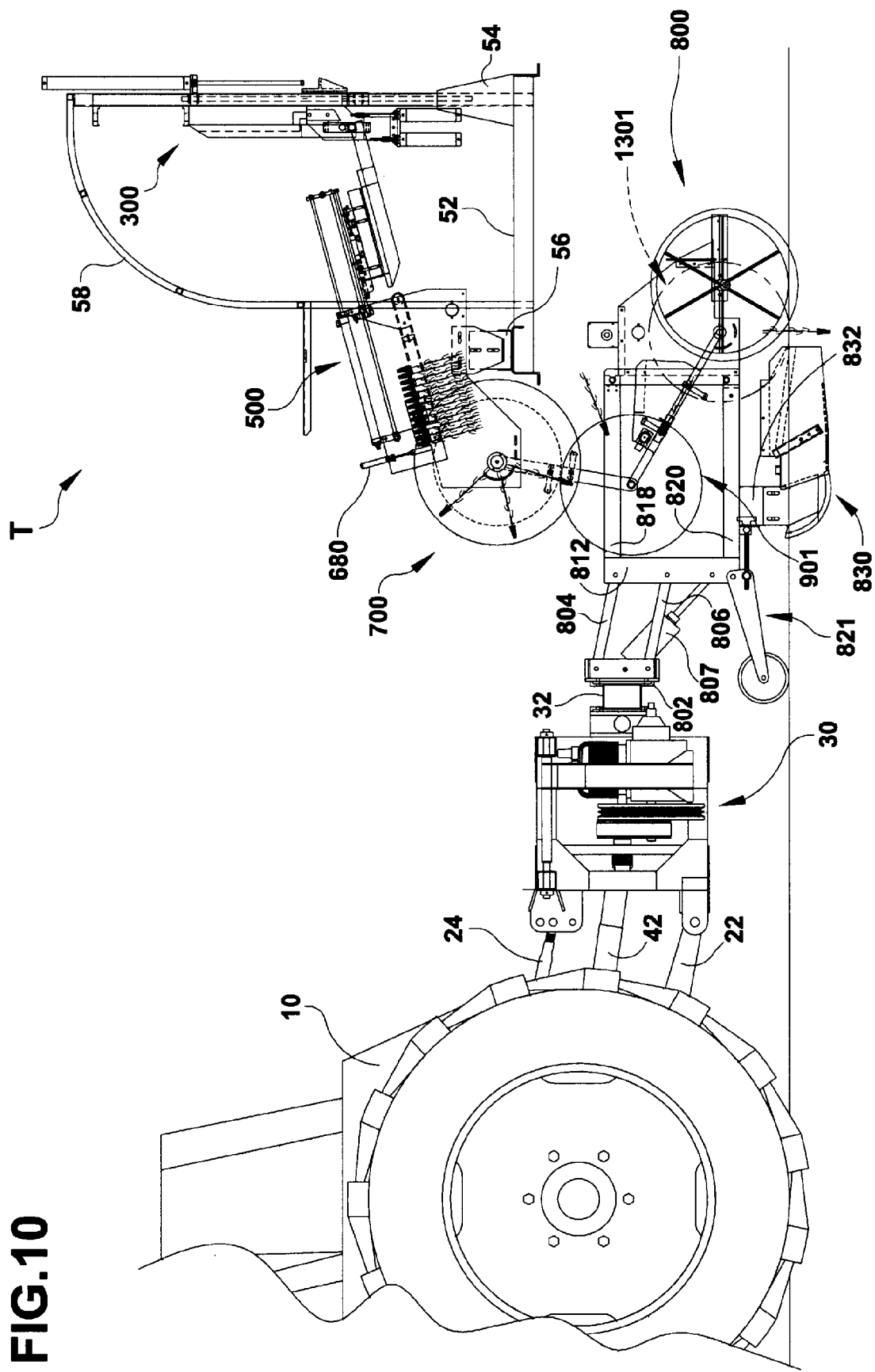

As can be seen from a comparison of FIGS. 7-8 with FIGS. 9-10 the distance between the disk assembly 901 and the disk assembly 1301 may be varied. Thus, FIGS. 7 and 8 show the distance between the disk 901 and 1301 when planting seedlings with 5 inch tall plants, and FIGS. 9 and 10 showing the disk positions when planting seedlings with 9 inch tall plants. As can be seen the disks 902 will be moved forwardly within the planter subassembly 800 when planting seedlings having longer stems.

SUMMARY

Plants are extracted from the tray and travel through the indexer up to the cut-off gate by the same method used on the original design. The inverter disc has been equipped with a pair of smaller diameter discs inside the original disc. When plants are discharged at the cut-off gate, the inverter disc grabs the root balls as normal. The inverter discs rotate the root ball to approximately the 7 or 8 o'clock position. At this location, the smaller diameter disc captures and pinches the plant foliage while the larger disc spreads apart allowing the root ball to hang free. Next, the middle transition discs capture the root ball and rotate the plant to the row unit planting disc. Vectoring air knives and shielding straighten the plant foliage to facilitate a hand-off to the row unit disc. To deal with the up and down movement of the row unit, the middle transition disc hangs on swing arms mounted from the inverter disc. Twin telescoping drag links connect the middle transition link to the row unit. An electric servo is coupled onto one of the telescoping drag links for changing stand off distance between the middle disc and the planting disc for different length plant stems. In operation, the middle transition disc swings forward as the row unit comes up and back as it drops, but always maintains the same plant hand off positions from disc to disc.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. A transplanting method for transplanting seedlings grown in trays having a plurality of side-by side rows of seedling cells, which method plants even though each row in the tray may have gaps between the seedlings, the method being characterized by the following steps:
    picking up an entire row of seedlings simultaneously from a tray by engaging the stems of the seedlings, which row in the tray may have gaps between seedlings;
    transferring the seedlings to a mechanism which eliminates gaps between seedlings; and
    maintaining full control of each seedling as the seedling is moved from the mechanism which eliminates gaps to the ground one at time with a desired spacing between the seedlings; whereby the seedlings are planted uniformly spaced apart in the ground.

2. A transplanting apparatus for transplanting seedlings grown in trays having a plurality of side-by side rows of seedling cells, which transplanting apparatus plants the seedlings uniformly apart even though each row in the tray may have gaps between the seedlings, the transplanting apparatus being characterized by the following:
    means (300) for picking up an entire row of seedlings simultaneously from a tray by engaging the stems of the seedlings;
    means (500) for eliminating gaps between seedlings; and
    means for discharging and planting the seedlings while maintaining full physical control of the seedling as the seedlings are moved from the means for eliminating gaps until the seedlings are planted.

3. The transplanting apparatus for transplanting seedlings as set forth in claim 2 wherein the means for discharging and planting the seedlings include
    an inverter disk assembly which received the seedling from the means for eliminating gaps between the seedlings,
    a middle plant disk transition assembly which receives the seedlings from the inverter disk assembly, and
    a row unit planting disk assembly which receives the seedlings from the middle plant transition disk assembly.

4. The transplanting apparatus for transplanting seedlings as set forth in claim 3 wherein the inverter disk assembly consists of a pair of outer disks, and a pair of inner disks, the inner disks having a smaller diameter than the outer disks.

5. The transplanting apparatus for transplanting seedlings as set forth in claim 4 wherein means are provided to cause the outer disks to initially grasp the seedlings, and, as the seedlings are rotated to a 7 or 8 o'clock position, to release the seedlings immediately after the inner disks have engaged the seedlings.

6. The transplanting apparatus for transplanting seedlings as set forth in claim 4 wherein the transition disks extend between the outer disks of the inverter disk assembly.

7. The transplanting apparatus for transplanting seedlings as set forth in claim 3 wherein the middle plant disk transition assembly is carried by a fixed length upper swing arm which swings about the axis of the inverter disk assembly, and a lower drag link which is secured about the axis of the row unit planting disk assembly.

8. The transplanting apparatus for transplanting seedlings as set forth in claim 7 wherein the length of the lower drag link is adjustable to accommodate seedlings of differing heights.

9. The transplanting apparatus for transplanting seedlings as set forth in claim 7 wherein the planting disk assembly is carried by a subframe which may move towards and away from the inverter disk assembly.

10. The transplanting apparatus as set forth in claim 2 further including
compressing means located between the means for eliminating gaps and the transferring means, which compressing means compresses the root balls along their length and straightens-up tipped root balls and better orient them for extraction.

11. The transplanter apparatus as set forth in claim 10 wherein the means for transferring the seedlings includes a gate movable between a lowered position where the gate prevents a seedling from being discharged, and a raised position which permits a seedling to be discharged, the means for transferring the seedlings further including root ball pinchers which act in concert with the gate to control the discharge of a root ball at selected time intervals, and further including control means to operate the root ball pinchers and the compressing means simultaneously.

12. The transplanter apparatus as set forth in claim 10 wherein knifes are carried to the sides of the compressing means for the purpose of cutting away trash that might be associated with the root balls.

\* \* \* \* \*